United States Patent [19]
Rogov et al.

[11] Patent Number: 5,124,017
[45] Date of Patent: Jun. 23, 1992

[54] ELECTROLYZER FOR REMOVING FLUORINE-CONTAINING IMPURITIES FROM WATER

[76] Inventors: Vladimir M. Rogov, ulitsa Moskovskaya, 67a, kv. 15; Nikolai S. Kuriljuk, Voroshilova, 28, kv. 51; prospekt Vladimir N. Anopolsky, ulitsa Moskovskaya, 60, kv. 112; Vladimir A. Shvorob, ulitsa K. Libknekhta, 83, kv. 123; Igor V. Moskalev, ulitsa Strutinskoi, 8, kv. 89, all of Rovno, U.S.S.R.

[21] Appl. No.: 543,779
[22] PCT Filed: Nov. 21, 1988
[86] PCT No.: PCT/SU88/00232
  § 371 Date: Jul. 18, 1990
  § 102(e) Date: Jul. 18, 1990
[87] PCT Pub. No.: WO90/05704
  PCT Pub. Date: May 31, 1990
[51] Int. Cl.5 .................. C25B 9/00; C25B 11/03; C25B 13/04
[52] U.S. Cl. ...................... 204/263; 204/283; 204/284
[58] Field of Search ............... 204/252–258, 204/263–266, 292, 283, 284, 151

[56] References Cited

U.S. PATENT DOCUMENTS

| | | | |
|---|---|---|---|
| 3,954,594 | 5/1976 | Recht | 204/263 |
| 4,119,518 | 10/1978 | Miller | 204/263 |
| 4,517,067 | 5/1985 | Byerley et al. | 204/283 X |
| 4,692,229 | 9/1987 | Bjareklint et al. | 204/283 X |
| 4,828,667 | 5/1989 | Silvestri et al. | 204/257 X |

Primary Examiner—Donald R. Valentine
Attorney, Agent, or Firm—Burgess, Ryan & Wayne

[57] ABSTRACT

An electrolyzer comprises a casing with branch pipes (8, 9) to supply and remove water, respectively, divided by a diaphragm (2) into an anode chamber (3) accommodating an integrated electrode (5) and a loose current-conducting charge (6) from particles of an electrochemically soluble material and a cathode chamber (4) accommodating a plate integrated electrode (7) and a loose charge (10) from particles of the material containing aluminium. The latter is placed in the chamber (4) between the electrode (7) and a wall of the casing (1).

2 Claims, 3 Drawing Sheets

ELECTROLYZER FOR REMOVING FLUORINE-CONTAINING IMPURITIES FROM WATER

BACKGROUND OF THE INVENTION

1. Technical Field

The invention relates to the field of purification of natural and waste waters, in particular, to electrochemical devices of a diaphragm type with integral or loose electrodes, and more particularly, to an electrolyzer for removing fluorine-containing impurities from water.

The electrolyzer makes it possible to obtain easily removable products of electrochemical reactions with adsorbed fluorides, ions of heavy, alkali and ferrous metals, petroleum products and other readily dispersed agents.

2. Description of the Related Art

Known in the art is an electrolyzer for purifying liquid media from impurities, which comprises a casing divided by a semi-permeable dielectric diaphragm into two chambers, namely, an anode chamber furnished with an electrochemically insoluble electrode and a cathode chamber with an electrode from metal or an alloy capable of chemically dissolving in alkali to form a coagulant, e.g., from aluminium or duralumin. The given electrolyzer can be used for removing fluorine-containing impurities from water. However, this electrolyzer is characterized by a low efficiency of using the products of electrode reactions occurring on the anode or cathode. Since the anode is made from an electrochemically insoluble material, the products of electrochemical dissolution of the anode actively sorbing fluorides or other impurities will not be generated (introduced) into the water being treated. In the prior art electrolyzer the cathode is made from an aluminium-containing metal (alloy) chemically soluble in alkali, therefore, the products of electrode reactions occurring at the cathode, particularly, hydroxyl groups $OH^-$ cannot be used effectively enough in the electrolyzer to purify fluorine-containing waters. These hydroxyl groups of of the known concentration create conditions of the hydrate-formation of magnesium ions $(Ma(OH)_2)$ whose flakes actively absorb fluorides. Besides, upon dissolving the surface of an aluminium-containing integrated electrode (cathode) in an alkali solution, a layer of gel-like coagulant is formed on this surface which results in screening the surface of the electrode (cathode) by the products of its chemical dissolution which, in turn, decreases the rate of electrochemical generation of $OH^-$ ions, concentration of magnesium hydroxide and the dissolution of the cathode to form a coagulant, as a result of all this the voltage in the electrolyzer is increased and the degree of purification is decreased.

Also known in the art is an electrolyzer for removing fluorine-containing impurities from water, comprising a casing divided by a semi-permeable dielectric diaphragm into two chambers, namely, an anode chamber accommodating an integrated electrode from an electrochemically insoluble material and a loose charge from particles of electrochemically soluble material, both connected with the positive terminal of a current source, and a cathode chamber accommodating an integrated electrode from an electrochemically insoluble material which is connected to the negative terminal of a current source, branch pipes for feeding and removing the water being purified which communicate with the cathode chamber. In so doing, the integrated electrode may be made either from a material chemically insoluble in an alkaline solution, e.g., a steel sheet, or a material chemically soluble in an alkaline solution, e.g., an aluminium (duralumin) sheet or rods.

However, when using an electrode from a material chemically insoluble in an alkaline solution, fluorides, or fluorides and ions of heavy metals and/or easily-dispersed suspended organic and/or mineral substances simultaneously present in the solution (Water) are removed only due to the products of electrode reactions taking place in the anode chamber (products of electrochemical dissolution of a loose charge). The products of electrochemical processes occurring on the electrode connected with the negative terminal of a current source - at the cathode are not used in purifying water from fluorides. This entails a higher electric power consumption and a greater size of apparatus employed for purification of fluorine-containing waters.

When using an integrated electrode from a material chemically soluble in an alkaline solution in the cathode chamber, the surface of this material is coated with the products of its dissolution. This increases the voltage in the electrolyzer and brings about passivation of the electrode connected with the negative terminal of the current source. As this electrode is passivated, the supply of $OH^-$ ions to the solution (water being treated) is cut off, i.e., the formation of alkali according to the reaction of electrochemical decomposition of water is terminated and this, in turn, results in the termination of electrochemical dissolution of loose charge arranged in the anode chamber (alkali and the products of dissolution of the charge arranged in the anode chamber are formed in equivalent quantities) and the process of water purification is discontinued.

SUMMARY OF THE INVENTION

It is a specific object of the invention to provide an electrolyzer for removing fluorine-containing impurities from water with such a structural embodiment of the electrode connected with the negative terminal of the current source and with such a structure of the cathode chamber which would help make the maximum use of the products of electrode reactions occurring at this electrode, for an effective removal of fluorides, and fluorides and ions of heavy metals, and/or suspended easily-dispersed organic and/or mineral substances simultaneously present in a solution (water) with a simultaneous reduction of electric power consumption and a decrease in the size of the electrolyzer.

The object is accomplished in that in the electrolyzer comprising a casing divided by a semi-permeable dielectric diaphragm into two chambers, namely, the anode chamber accommodating an integrated electrode from an electrically insoluble material and a loose current-conducting charge from particles of an electrochemically soluble material connected with the positive terminal of the current source, and the cathode chamber accommodating an integrated electrode from an electrochemically insoluble material connected with the negative terminal of the current source, branch pipes to supply and remove the water being purified communicating with the cathode chamber, according to the invention, the cathode chamber additionally accommodates a loose charge from particles of the material containing aluminum.

In order to intensify the process of using the products of reactions taking place in the cathode chamber it is expedient that the loose charge be placed in the latter between the casing wall and the integrated electrode, in so doing, the integrated electrode per se should be made in the form of a perforated plate arranged at an angle to the diaphragm so that the distance between the diaphragm and this electrode grows in the direction from the supply branch pipe towards the discharge one in the cathode chamber.

In case it is necessary to intensify the process of mass transfer in the cathode chamber, it is desirable that the latter be furnished with a by-pass communicating the cavities formed to the different sides of a plate electrode disposed in this chamber.

The electrolyzer for removing fluorine-containing impurities from water, made in accordance with the present invention, ensures the maximum use of the products of reactions taking place at the cathode during electrolysis thereby facilitating effective removal of fluorides and ions of heavy metals, and/or suspended easily-dispersed organic and/or mineral substances simultaneously present in the solution, from the liquid (water) being purified, with minimal electric power consumption, size of the electrolyzer, as well as higher capacity of the electrolyser.

BRIEF DESCRIPTION OF THE DRAWINGS

The invention will be more apparent from the description of exemplary embodiments thereof, reference being made to the accompanyings, wherein.

BEST MODE FOR CARRYING OUT THE INVENTION

Figure 1:
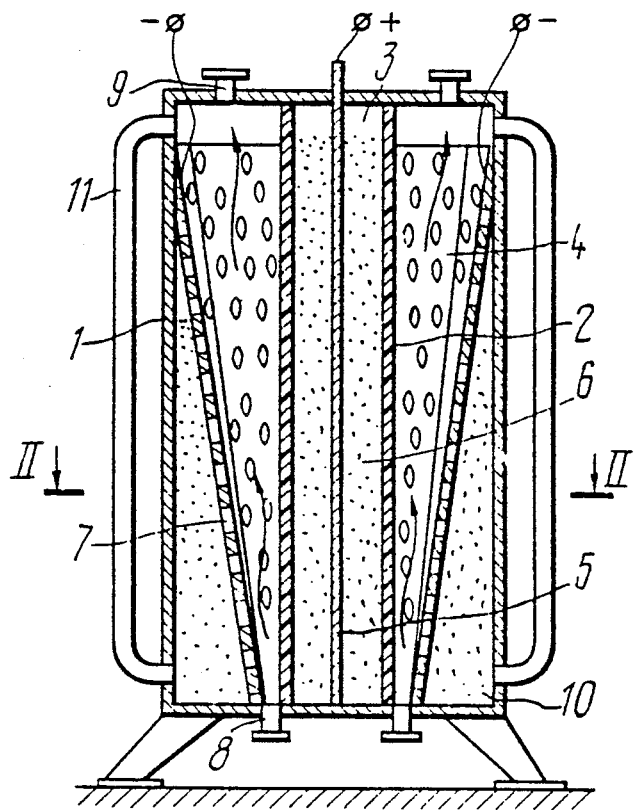
FIG. 1 is a longitudinal cross-section of the variant of a column-type electrolyzer for removing fluorine-containing impurities from water, according to the invention.
Figure 2:
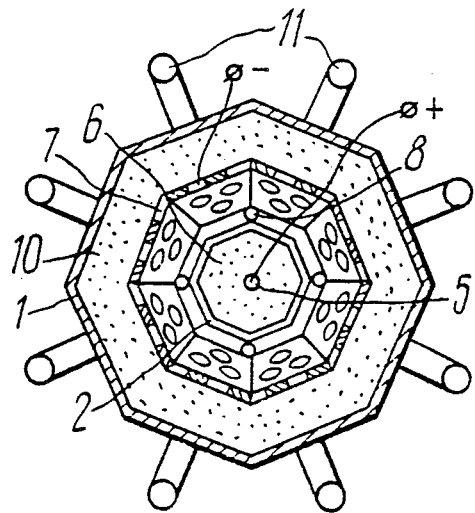
FIG. 2 is a cross-section taken along II—II as in FIG. 1.

An electrolyzer for removing fluorine-containing impurities from water shown in FIGS. 1 and 2, comprises a vertically arranged octahedral casing 1 made from a dielectric material, e.g., polyvinyl chloride sheets, or a current conducting material, e.g., steel, but lined with a dielectric, e.g., polyvinyl chloride sheets. The casing 1 is divided by a semi-permeable dielectric diaphragm 2, arranged coaxially with respect to the casing 1, into an anode and cathode chambers 3, 4, respectively. Polyvinyl chloride fiber, belting or other porous dielectric material can be used as the material of the diaphragm 2. The anode chamber 3 is disposed in the central, and the cathode chamber 4 - in the peripheral part of the casing 1. Mounted in the anode chamber 3 is an integrated electrode 5 from an electrochemically insoluble material, e.g., graphite. The electrode 5 is made in the form of a rod whose axis of symmetry coincides with that of the casing 1, the electrode 5 being connected to the positive terminal of the current source (current source is not conventionally shown in the drawings). Also arranged in the anode chamber 3 is loose charge 6 from particles of an electrochemically soluble material, e.g., a mixture of aluminium and steel grit representing production wastes. The charge 6 directly makes contact with the electrode 5 to fill the space limited by the diaphragm 2. The cathode chamber 4 accommodates an integrated electrode 7 from a material e.g., steel/chemically insoluble in alkaline solution. The electrode 7 is made in the form of perforated plates being the edges of a truncated octahedral pyramid which are mounted at an angle to the diaphragm 2 and the walls of the casing 1. The electrode 7 is connected to the negative terminal of the current source. The casing 1 is also furnished with a supply 8 and discharge 9 branch pipes of purified water which are arranged in the lower and upper parts of the casing 1, respectively, and communicate with the cathode chamber 4. Besides, in the cathode chamber 4 between the wall of the casing 1 and the electrode 7 provision is made for a loose charge 10 consisting of particles of the material containing aluminium, e.g., aluminium grit and/or granules of waste aluminium oxide representing production wastes. The distance between the diaphragm 2 and the electrode 7 grows in the direction from the supply branch pipe 8 towards the discharge branch pipe 9 of water from the cathode chamber 4. The cathode chamber 4 is also furnished with C-shaped by-passes 11 communicating the cavities formed to the different sides of the electrode 7 arranged in this chamber 4.

Figure 3:
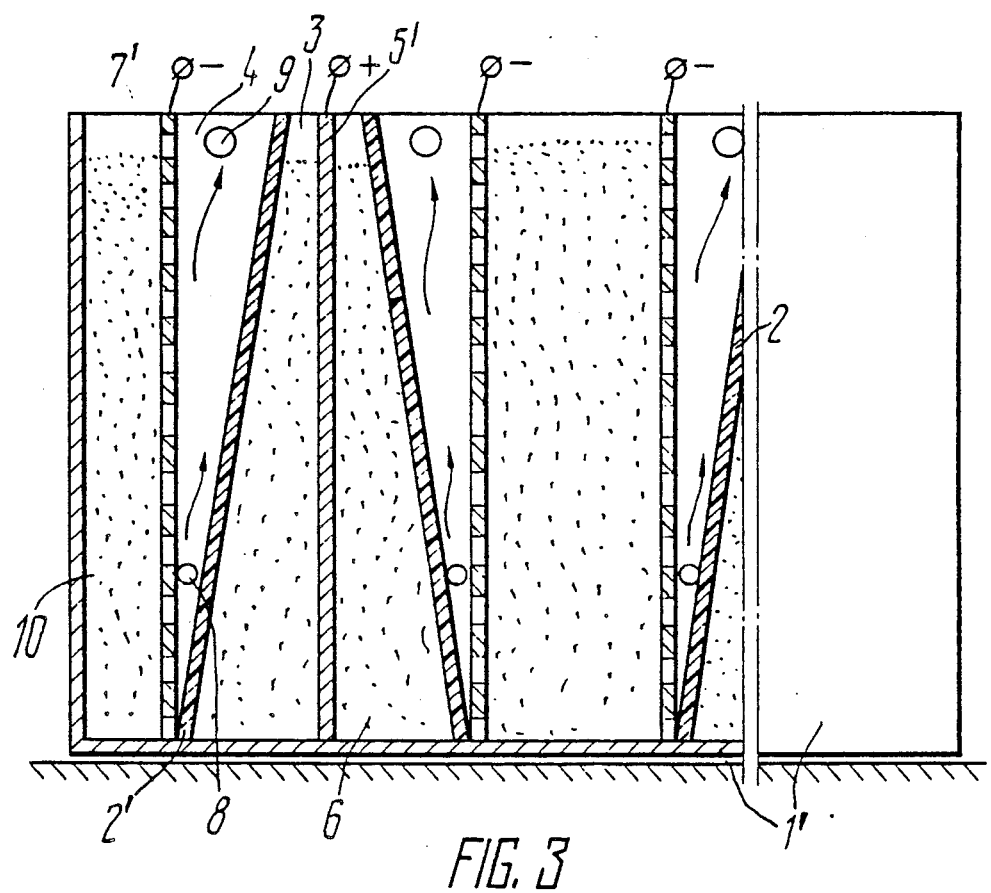
FIG. 3 is a partial longitudinal cross-section of a bank of electrolyzers for removing fluorine-containing impurities from water, according to the invention, arranged in a rectangular casing.

In the exemplary embodiment of the electrolyzer illustrated in FIG. 3 and representing a bank of electrolyzers for removing fluorine-containing impurities, as distinct from the electrolyzer shown in FIG. 1 and 2 the casing $1^1$ is made in the form of a rectangular bath from a dielectric material, e.g., polyvinyl chloride sheets or fluoroplast or Teflon, or from current-conducting material, e.g., stainless steel, but lined inside. With a dielectric material, e.g., polyethylene film, polyvinyl chloride sheets or belting secured to the walls of the casing $1^1$ with glue. Transversely, the casing $1^1$ is divided by a semi-permeable dielectric diaphragms 2, arranged at an angle to the side walls of the casing $1^1$, into anode 3 and cathode 4 banks of the chambers. Polyvinyl chloride fiber, belting, thin ceramic plates or porous plastic sheets may be used as the material of diaphragms 2. The anode chambers 3 are limited by at least one pair of inclined diaphragms 2 and the longitudinal walls of the casing $1^1$ and contain, as a minimum, one integrated electrode $5^1$ each from an electrochemically insoluble material, e.g., stainless steel, graphite or lead. Each electrode $5^1$ is made in the form of a plate mounted perpendicular to the bottom of the casing $1^1$ in the plane of symmetry of a respective anode chamber 3. The electrodes $5^1$ are connected to the positive terminal of the current source (current source is not shown conventionally either). The anode chamber 3 also accommodates a loose charge 6 from particles of an electrochemically soluble material, e.g., a mixture of aluminium and steel grit representing production wastes. The charge 6 directly makes contact with the electrode $5^1$ and diaphragms 2.

The cathode chambers 4 are limited by longitudinal walls of the casing $1^1$, as well as a pair of diaphragms 2, or (two extreme cathode chambers 4) the diaphragm 2 and the transverse wall of the casing $1^1$. Each cathode chamber 4 accommodates integrated electrodes 7 from a material chemically insoluble in an alkaline solution, e.g., steel or stainless steel. The electrodes 7 are made in the form of perforated plates mounted perpendicular to the bottom of the casing $1^1$ and at an angle to the inclined diaphragms 2.

The casing $1^1$ is furnished with water supply 8 and discharge 9 branch pipes arranged in the lower and upper parts of the casing $1^1$ respectively, and communicating each pair of branch pipes 8, 9 with a respective chamber 4.

The distance between each inclined diaphragm 2 and the electrode closest thereto grows in the direction from the lower to the higher part of the casing $1^1$, from purified water supply 8 towards discharge 9 branch pipe. The electrodes 7 are connected to the negative terminal of the current source.

Besides, in the cathode chambers 4 in the space limited by the longitudinal walls of the casing $1^1$, electrode 7 and the transverse wall of the casing 1 or another electrode 7 provision is made for a loose charge 10 consisting of particles of the material containing aluminium, e.g., aluminium grit and/or waste aluminium oxide.

In the given exemplary embodiment of the electrolyzer the structure of its elements has been simplified to the maximum extent and there is a possibility of increasing the quantity of the modes of water treatment (different hydraulic load on the apparatus, water treatment in several successive or parallel stages, etc.).

Figure 4:
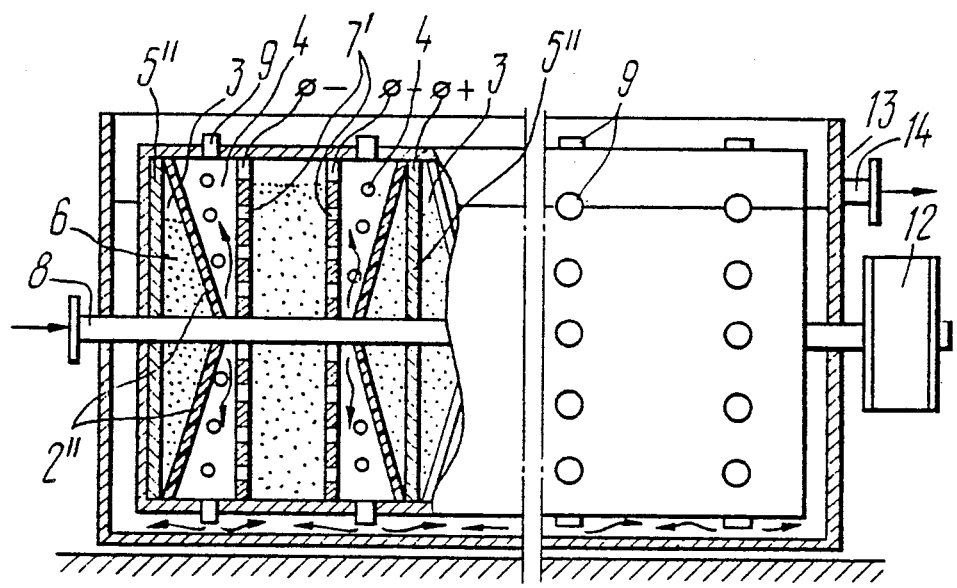
FIG. 4 is a partial longitudinal cross-section of a bank of electrolyzers, according to the invention, with a cylindrical casing furnished with a device for rotation.

The variant of the electrolyzer shown in FIG. 4 contains a bank of electrolyzers according to the invention arranged in a cylindrical casing $1^{11}$ made from a dielectric material, e.g., fluoroplast or Teflon. The casing $1^{11}$ is divided by cone-shaped diaphragms $2^1$, disposed perpendicular to the axis of symmetry of the casing $1^{11}$, into anode and cathode chambers 3, 4, respectively.

The anode and cathode chambers 3, 4 alternate along the axis of symmetry of the casing $1^{11}$. Each anode chamber 3 accommodates one integrated electrode $5^{11}$ from an electrochemically insoluble material, e.g., stainless steel, connected to the positive terminal of the current source and made in the form of a disk arranged perpendicular to the axis of symmetry of the casing $1^{11}$. Each cathode chamber 4 also accommodates two integrated disk-shaped electrodes $7^1$ connected to the negative terminal of the current source. A loose aluminium-containing charge 10, e.g., wastes of chemical plants containing waste aluminium oxide, is disposed between the integrated disk-shaped electrodes $7^1$. The casing $1^{11}$ is provided with a water supply branch pipe 8 which a perforated pipeline whose axis of symmetry coincides with that of the casing $1^{11}$, and the perforation opening are provided in the cathode chambers 4. The water discharge branch pipes 9 are arranged on the side cylindrical surface of the casing $1^{11}$ and communicate with the cathode chambers 4. Also unlike the electrolyzer shown in FIG. 4, the given electrolyzer additionally accommodates a device 12 to ensure rotation of the casing $1^{11}$ around the axis of its symmetry, and the electrolyzer per se is placed in an auxiliary casing 13 of rectangular shape made in the form of a bath having a common purified water discharge branch pipe 14. The device 12 is secured on an auxiliary casing 13 and may represent, e.g., an electric motor-reduction-gear articulated with the branch pipe 8. The device 12 can also be made in the form of a water-filling wheel whose rotation axis coincides with that of the casing $1^{11}$ and which is rigidly secured in the water supply branch pipe 8. Between the casing $1^{11}$ and the auxiliary casing 13 provision is made for a volume to be filled with water which has been treated in the bank of electrolyzers arranged in the casing $1^{11}$. Besides, on the side surface of the casing $1^{11}$ provision is made for loading-unloading hatches to fill the chambers 3,4 with loose charge 6, 10 (hatches are not conventionally shown), and in the places of connection of the auxiliary casing 13 and the water supply branch pipe 8 provision is made for glands (glands are not conventionally shown in the drawings either).

Figure 5:
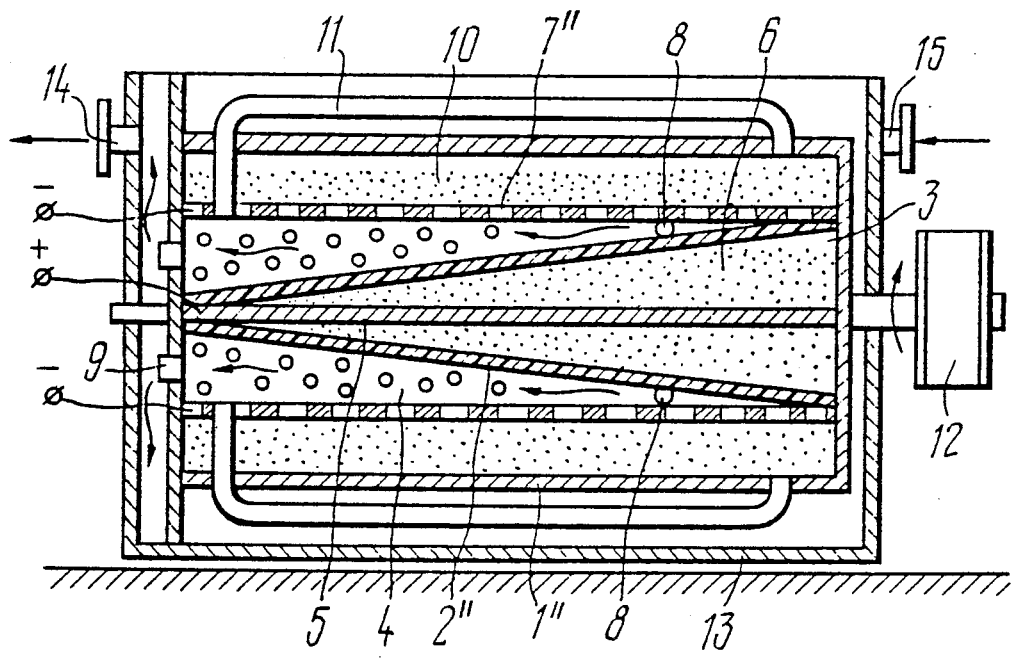
FIG. 5 is a longitudinal cross-section of an electrolyzer of a column type according to the invention provided with a device for rotating the casing.

The variant of the electrolyzer shown in FIG. 5 contains a horizontally arranged cylindrical casing $1^{11}$ made from a dielectric, e.g., polychlorovinyl sheets or steel, lined inside with dielectric. The casing $1^{11}$ is divided by a semi-permeable dielectric diaphragm $2^{11}$ being a cone whose axis of symmetry coincides with that of the casing $1^{11}$. The diaphragm $2^{11}$ is made, e.g., from tarpaulin cloth and is secured on the frame from dielectric. The anode chamber 3 is located in the central, and the cathode chamber 4—in the peripheral part of the casing $1^{11}$. Arranged in the anode chamber 3 is an integrated electrode 5 from an electrochemically insoluble material, e.g., stainless steel. The electrode 5 is made in the form of a rod whose axis of symmetry coincides with that of the casing $1^{11}$, the electrode 5 being connected with the positive terminal of the current source via sliding contacts (contacts connecting the electrode and current source are not conventionally shown). The anode chamber 3 also accommodates the loose charge 6 from particles of electrichemically soluble material, e.g. pig iron grit and/or aluminium chip. The charge 6 fills the space limited by the diaphragm $2^{11}$ and periodically, as it is dissolved, it is reloaded through a loading hatch (loading hatch is not conventionally shown). In the cathode chamber 4 there is arranged an integrated electrode $7^{11}$ made in the form of a perforated cylinder whose axis of symmetry coincides with that of the casing $1^{11}$. The electrode $7^{11}$ can be made from a steel tube. The given electrode $7^{11}$ is connected with the negative terminal of the current source by means of a sliding contact (contact is not conventionally). The casing $1^{11}$ is furnished with the water supply branch pipes 8 arranged on the side surface of the casing $1^{11}$, and the water discharge branch pipes 9 disposed on the end wall of the casing $1^{11}$. The branch pipes 8 and 9 communicate with the cathode chamber 4. In the cathode chamber 4 between the wall of the casing $1^{11}$ and electrode $7^{11}$ there is a loose charge 10 consisting of particles of the material containing aluminium, e.g., production wastes representing waste aluminium oxide or aluminium chip. The electrode $7^{11}$ and diaphragm $2^{11}$ are arranged so that their axes of symmetry coincide and the distance between the diaphragm $2^{11}$ and the electrode $7^{11}$ grows in the direction from the branch 8 for supply towards branch 9 for discharge of water from the cathode chamber 4. Besides, the cathode chamber 4 is provided with $\pi$-shaped by-passes 11 communicating the cavities formed in the cathode chamber 4 to the different sides of the electrode $7^{11}$ which is located in this chamber 4. The given electrolyzer is also equipped with a device 12 for rotating the casing $1^{11}$ around its axis of symmetry, a rectangular auxiliary casing 13 made in the form of bath, common branch pipes 14, 15 for discharging the purified and supplying the water being purified, respectively. The device 12 is secures on the auxiliary casing 13 and may be an electric motor-reduction gear whose output shaft is articulated with the shaft of the casing $1^{11}$, the electrode 5 acting as this shaft. The device 12 can also be made in the form of a water-filling wheel whose axis of rotation coincides with that of the casing $1^{11}$. Between the casing $1^{11}$ and the auxiliary casing 13 provision is made for a volume to be filled with water supplied along the common supply branch pipe 15 installed in the upper part of the casing 13. In the places of interaction between the auxiliary casing 13 and the electrode 5 additionally acting as the casing $1^{11}$ rotation shaft provision is made for glands which are not conventionally shown in the drawing.

The electrolyzer shown in FIGS. 1 and 2 operates as follows. Water polluted with fluorides, or fluorides and ions of heavy metals and/or suspended easily dispersed substances of mineral or organic origin is fed to be purified via the water supply branch pipes 8. The water fills the cathode chamber 4 and, flowing over through the openings (pores) in the diaphragm 2 gets into the anode chamber 3. As current is fed to the electrodes 5 and 7 connected to the positive and negative terminals of the current source, respectively, the water being treated is enriched with the products of electrode reactions taking place during electrolysis, namely, the ions of the electrochemically soluble loose charge 6, e.g., the ions of aluminium and iron, as well as the ions $H^+$ and $OH^-$. The products of anodic dissolution of the charge 6 are carried away from the anode chamber 3 by a flow of water being treated and flowing over through the openings (pores) in the diaphragm 2 and are coagulated thanks to the transition into hydroxides and mixing of the flow. The optimal conditions for mixing, likewise flake formation, is maintained by a smooth decline in the velocity of the flow of water being treated in the cathode chamber 4 due to a gradual increase of the distance between the diaphragm 2 and the electrode 7 in the direction from the water supply branch pipe 8 towards the water discharge branch pipe 9 arranged in the lower and upper parts of the casing 1 of the electrolyzer, respectively. A high efficiency of water purification from fluorides is ensured also by the fact that the electrode 7 connected to the negative terminal of the current source is made as a combination one, i.e., consists of a material chemically insoluble in the alkaline solution and a loose charge 10 chemically soluble in the alkaline solution. This makes it possible to optimize the process of electrochemical preparation of alkali ($OH^-$) on the electrode 7 and make an effective use of this alkali to dissolve the loose charge 10 consisting of particles of the aluminium containing material. As the charge 10 is dissolved, an aluminium-containing coagulant, effective in removing fluorides from water, is introduced into the water being treated in addition to the coagulant obtained electrochemically. Besides, when discharging water molecules on the chemically insoluble electrode 7, the concentration of $OH^-$ ions can be brought to values required to deposit the ions of magnesium ($Mg(OH)_2$), which is also an effective coagulant in removing fluorides from water. As the products of chemical dissolution of charges 10 and 6 are mixed in the cathode chamber 4, they circulate along a by-pass 11, thereby ensuring an effective sorption of fluorides and formation of large, quickly-depositing flakes upon removal from the electrolyzer. Water circulation along the by-pass 11 also provides optimal conditions for dissolving the charge 10 (feeding the $OH^-$ ions and withdrawing the products of chemical dissolution of the charge 10), thus preventing slurrying of the pore space in the charge 10.

When purifying the initial fluorine-containing water having an alkaline reaction (pH 10 ... 12) it is possible to effectively use the electrolyzer also without feeding current from the current source to the electrodes 5 and 7, or in case of a short-term feed of current only to correct the values Eh and pH within insignificant limits and regeneration of the charges 6 and 10 by electrolysis gases.

The variant of the electrolyzer shown in FIG. 3 operates analogously to the electrolyzer illustrated in FIGS. 1, 2 with the only difference that in this case when purifying water it is possible to provide regimes of parallel and successive treatment, e.g., water treatment in the cathode and then anode chambers 4, 3, respectively, or vice versa, as well as in the cathode (anode) chamber 4(3) of the "first step", in the cathode (anode) chamber 4(3) of the "second step", etc. Since the electrolyzer shown in FIG. 3 is a bank of electrolyzers, the number of variants of water treatment using the latter will grow as the quantity of cathode and anode chambers 4, 3, increases, respectively, which may be used to purify water with a varying initial concentration of fluorides and/or other ingredients polluting the water.

The variant of the electrolyzer illustrated in FIG. 4 operates analogously to the one shown in FIG. 3 with the only difference that in this electrolyzer water is treated in a "parallel regime", i.e., dividing the initial flow of water into parts and feeding these parts of the flow of initial water to individual sections of the electrolyzers placed in the rotating casing $1^{11}$.

The treated water is carried away along the branch pipes 9 in portions and is collected in the volume of an auxiliary casing 13, where due to the rotation of the casing $1^{11}$ coagulant-saturated treated water is additionally stirred to form large, quickly-depositing flakes with absorbed fluorides and other ingredients polluting the water. After additional mixing and stirring the water is fed along a branch pipe 14 to a separator of solid and liquid phases (not shown in FIG. 4).

The casing $1^{11}$ of the electrolyzer bank is rotated by means of a device 12, which in case it is made in the form of a water-filling wheel, is rotated owing to the use of the energy of supplied water. The rotation of the casing $1^{11}$ also makes it possible to intensify the process of chemical dissolution of the charges 10 and 6, in particular, during the treatment of initial waters with a higher content of suspended agents. This variant of the electrolyzer can also operate without feeding current to the electrodes $5^{11}$ and $7^{11}$ from an electric current source, i.e., only due to chemical dissolution of the loose charge 10 arranged in the cathode chamber 4 and mechanical dissolution (wearing out by attrition) of charges 10 and 6 as a result of the casing $1^{11}$ rotation. Besides, the casing $1^{11}$ rotation makes it possible to ensure regeneration (activisation) of the surfaces of the electrodes $5^{11}$ and $7^{11}$ by treating the latter with a fluidized (mixing) charge 10 and 6, as well as obtaining a coagulant with a high degree of dispersion, e.g., Al $(OH)_3$ actively sorbing fluorides by its surface. In this exemplary embodiment the casing $1^{11}$ rotates around the axis arranged perpendicular to the planes of the electrodes $7^{11}$.

The variant of the electrolyzer shown in FIG. 5 operates analogously to that shown in FIG. 4 with the exception that the casing $1^{11}$ rotation axis is parallel to the planes of the electrode $7^{11}$ and 5. Besides, water is supplied and carried away by means of common branch pipes 15, 14 communicating, respectively, with the casing 13. Water can be treated under static conditions which simplifies the electrolyzer operation and only during the regeneration of charges 6 and 10, as well as the electrodes 5 and $7^{11}$, and the diaphragm $2^{11}$ effect a short term rotation of the casing $1^{11}$.

The process of water defluorination in the variants of the electrolyzers according to the invention is automatically regulated to provide a high reliability of their operation and employment in the technology of water purification, e.g., circulating water at industrial plants where it is necessary to ensure high reliability in supplying the consumer with a desired quality of water. It is also expedient that the given electrolyzers be employed to condition drinking water, to partially correct its ionic-molecular and colloidal composition, in particular, the concentration of fluorides, the value of medium active reaction (pH), oxidizing-reducing potential (Eh) and the value of buffer properties. At the same time, one can easily readjust the process by purposeful selection of the composition of the loose charge 6, 10 and/or the mode of intensity of electrical effect on water to be treated, which is fairly important in flexible production processes.

INDUSTRIAL APPLICABILITY

The invention can be employed in the chemical, electrochemical, machine-building, power, food and other industries to purity water, primarily, from fluorides, as well as from fluorides and ions of heavy metals, and/or readily dispersed suspended organic and/or mineral substances, similtaneously being present in a solution (water) by sorbing them in the products of electrochemical reactions.

We claim:

1. An electrolyzer for removing fluorine-containing impurities from water, comprising a casing divided by a semi-permeable dielectric diaphragm into two chambers comprising an anode chamber accommodating a first, electrochemically insoluble electrode and a loose, particulate, current-conducting charge of an electrochemically soluble material, connected to the positive terminal of the current source, and a cathode chamber accommodating a second electrochemically insoluble electrode, connected with the negative terminal of the current source, and a loose charge including particles of a material containing aluminum arranged between a wall of the casing and the second electrode wherein the second electrode divides the cathode chamber into two cavities and is in the form of a perforated plate disposed at an angle to the semi-permeable dielectric diaphragm so that the distance between the diaphragm and the second electrode increases in a direction from an inlet means toward a discharge means for water from the cathode member.

2. An electrolyzer of claim 1 wherein the cathode chamber comprises a liquid conveying conduit which provides liquid communication between the cavities formed by the perforated electrode disposed in the cathode chamber.

* * * * *